(12) United States Patent
Proudler

(10) Patent No.: US 7,917,752 B2
(45) Date of Patent: Mar. 29, 2011

(54) METHOD OF CONTROLLING THE PROCESSING OF DATA

(75) Inventor: Graeme John Proudler, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2539 days.

(21) Appl. No.: 10/643,306

(22) Filed: Aug. 18, 2003

(65) Prior Publication Data

US 2005/0076209 A1 Apr. 7, 2005
US 2008/0276086 A9 Nov. 6, 2008

(30) Foreign Application Priority Data

Aug. 23, 2002 (GB) .................... 0219664.0

(51) Int. Cl.
*H04L 9/00* (2006.01)
(52) U.S. Cl. ...................................... 713/165
(58) Field of Classification Search ............... 726/1, 26, 726/27, 28, 29; 713/189, 193, 165, 166
See application file for complete search history.

(56) References Cited

U.S. PATENT DOCUMENTS

| 4,562,306 A | 12/1985 | Chou et al. ............... 178/22.08 |
| 4,918,653 A | 4/1990 | Johri et al. ....................... 726/23 |
| 5,008,936 A | 4/1991 | Hamilton et al. ............. 380/281 |
| 5,355,414 A | 10/1994 | Hale et al. ........................ 726/34 |
| 5,359,659 A | 10/1994 | Rosenthal ........................ 726/24 |
| 5,361,359 A | 11/1994 | Tajalli et al. ................... 395/700 |
| 5,390,297 A | 2/1995 | Barber et al. .................... 726/29 |
| 5,406,624 A | 4/1995 | Tulpan ........................... 713/192 |
| 5,473,692 A | 12/1995 | Davis .............................. 380/25 |
| 5,517,569 A | 5/1996 | Clark .............................. 380/52 |
| 5,533,126 A | 7/1996 | Hazard ........................ 713/187 |
| 5,680,547 A | 10/1997 | Chang ..................... 395/200.01 |
| 5,825,879 A | 10/1998 | Davis ............................. 380/216 |
| 5,870,723 A | 2/1999 | Pare et al. ....................... 705/39 |
| 5,903,732 A | 5/1999 | Reed et al. ................ 395/200.59 |
| 5,933,498 A | 8/1999 | Abrams et al. ..................... 380/4 |
| 5,937,159 A | 8/1999 | Meyers et al. .................. 726/20 |
| 5,943,423 A | 8/1999 | Muftic ............................ 705/67 |
| 5,990,927 A | 11/1999 | Hendricks et al. ............ 725/132 |
| 5,991,399 A | 11/1999 | Graunke et al. ............... 380/279 |
| 6,006,332 A | 12/1999 | Christian et al. .............. 713/201 |
| 6,023,765 A | 2/2000 | Kuhn ............................. 713/200 |
| 6,028,933 A | 2/2000 | Heer et al. ..................... 713/169 |
| 6,091,835 A | 7/2000 | Smithies et al. .............. 382/115 |
| 6,092,147 A | 7/2000 | Levy et al. ........................ 711/6 |

(Continued)

FOREIGN PATENT DOCUMENTS

EP 0 421 409 A 4/1991

(Continued)

OTHER PUBLICATIONS

Ashley, Paul, et al., "Using SESAME to Implement Role Based Access Control in Unix File Systems," *Infrastructure for Collaborative Enterprises, Proceedings, IEEE 8*, pp. 141-146 (Jun. 1999).

(Continued)

*Primary Examiner* — Beemnet W Dada

(57) ABSTRACT

A method of controlling the processing of data, is provided comprising defining security controls for a plurality of data items, and applying individualised security rules to each of the data items based on a measurement of integrity of a computing entity to which the data items are to be made available.

44 Claims, 6 Drawing Sheets

U.S. PATENT DOCUMENTS

| | | | |
|---|---|---|---|
| 6,092,202 A | 7/2000 | Veil et al. | 713/201 |
| 6,157,719 A | 12/2000 | Wasilewski et al. | 380/210 |
| 6,219,788 B1 | 4/2001 | Flavin | 713/194 |
| 6,236,971 B1 | 5/2001 | Stefik et al. | 705/1 |
| 6,246,767 B1 | 6/2001 | Akins et al. | 380/210 |
| 6,266,416 B1 | 7/2001 | Sigbjørnsen et al. | 380/255 |
| 6,289,462 B1 | 9/2001 | McNabb et al. | 713/201 |
| 6,307,939 B1 | 10/2001 | Vigarie | 380/210 |
| 6,327,652 B1 | 12/2001 | England et al. | 713/2 |
| 6,330,670 B1 | 12/2001 | England et al. | 713/2 |
| 6,343,280 B2 | 1/2002 | Clark | 705/55 |
| 6,363,488 B1 | 3/2002 | Ginter et al. | 726/1 |
| 6,378,072 B1 | 4/2002 | Collins et al. | 713/187 |
| 6,463,474 B1 | 10/2002 | Fuh et al. | 709/225 |
| 6,477,648 B1 | 11/2002 | Schell et al. | 726/22 |
| 6,499,110 B1 * | 12/2002 | Moses et al. | 726/1 |
| 6,510,513 B1 | 1/2003 | Danieli | 713/156 |
| 6,609,199 B1 | 8/2003 | DeTreville | 713/187 |
| 6,697,948 B1 * | 2/2004 | Rabin et al. | 726/30 |
| 6,775,779 B1 | 8/2004 | England et al. | 726/26 |
| 6,820,063 B1 | 11/2004 | England et al. | 705/54 |
| 6,857,067 B2 | 2/2005 | Edelman | 713/155 |
| 7,124,938 B1 | 10/2006 | Marsh | 235/382 |
| 2002/0012432 A1 | 1/2002 | England et al. | 380/231 |
| 2002/0019934 A1* | 2/2002 | Ishizaki | 713/164 |
| 2003/0005289 A1 | 1/2003 | Gougeon et al. | 713/156 |
| 2003/0056054 A1 | 3/2003 | Levy et al. | 711/6 |
| 2003/0196085 A1 | 10/2003 | Lampson et al. | 713/156 |
| 2003/0196119 A1* | 10/2003 | Raley et al. | 713/201 |

FOREIGN PATENT DOCUMENTS

| | | |
|---|---|---|
| EP | 0 580 350 A1 | 1/1994 |
| EP | 0 684 538 A | 11/1995 |
| EP | 0 717 337 A1 | 6/1996 |
| EP | 0 849 657 A | 6/1998 |
| EP | 0 895 148 A1 | 2/1999 |
| EP | 1 041 481 A2 | 10/2000 |
| EP | 1 076 279 A1 | 2/2001 |
| EP | 1 081 891 A2 | 3/2001 |
| EP | 02255245.9 | 7/2002 |
| GB | 2 267 631 A | 12/1993 |
| GB | 2 317 476 A | 3/1998 |
| GB | 0020441.2 | 8/2000 |
| GB | 2 365 160 A | 2/2002 |
| GB | 2 372 343 A | 8/2002 |
| GB | 2 372 594 A | 8/2002 |
| GB | 2 372 595 A | 8/2002 |
| JP | 10-333902 | 12/1998 |
| JP | 2001 148037 | 11/1999 |
| WO | 93/24906 | 12/1993 |
| WO | 95/27249 | 12/1995 |
| WO | 95/33239 A1 | 12/1995 |
| WO | 98/36517 A | 8/1998 |
| WO | 98/44402 A | 10/1998 |
| WO | 9844402 A1 | 10/1998 |
| WO | 00/31644 | 6/2000 |
| WO | 00/45241 A2 | 8/2000 |
| WO | 00/48063 | 8/2000 |
| WO | 00/58859 | 10/2000 |
| WO | 01/01224 A1 | 1/2001 |
| WO | 01/27722 A1 | 4/2001 |
| WO | 01/46785 | 6/2001 |
| WO | 01/65366 A1 | 9/2001 |
| WO | 01/95071 A2 | 12/2001 |

OTHER PUBLICATIONS

Neuman, B.C., et al., "Kerberos: An Authentication Service for Computer Networks," *IEEE Communications Magazine*, pp. 33-38 (Sep. 1994).

Schneck, P.B., "Persistent Access Control to prevent piracy of digital information," *Proceedings of the IEEE*, vol. 87, No. 7, pp. 1239-1250 (Jul. 1999).

Yee, B., "Using Secure Coprocessors," Doctoral thesis—Carnegie Mellon University, pp. 1-94 (May 1994).

"Building a Foundation of Trust in the PC," *Trusted Computing Platform Alliance*, pp. 1-7 (Jan. 2000).

"Information technology—Security techniques—Entity authentication; Part 3: Mechanisms using digital signature techniques," *ISO/IEC* 9798-3, Second Edition, pp. 1-6 (1998).

"Information technology—Security techniques—Key management—Part 3: Mechanisms using a asymmetric techniques," *ISO/IEC* 11770-3, pp. 1-34 (1999).

*Trusted Computing Platform Alliance (TCPA), Main Specification*, Version 1.0, pp. 1-284 (2000).

*Trusted Computing Platform Alliance (TCPA), TCPA Design Philosophies and Concepts*, Version 1.0, Internet: <www.trustedpc.org> pp. 1-30 (Jan. 2001).

U.S. Appl. No. 10/049,211, filed Feb. 5, 2002, Pearson et al.
U.S. Appl. No. 10/049,213, filed Feb. 5, 2002, Pearson et al.
U.S. Appl. No. 10/088,258, filed Mar. 13, 2002, Pearson et al.
U.S. Appl. No. 10/296,557, filed Nov. 22, 2002, Proudler.

* cited by examiner

| Question no. | Question |
|---|---|
| 1 | AGE ? |
| 2 | GENDER ? |
| 3 | NAME ? |
| 4 | ADDRESS ? |
| . | |
| . | |
| . | |
| 25 | HAVE YOU HAD OR DO YOU HAVE DISEASE X |
| . | |
| . | |
| . | |

Definitions:

H, always contact owner.

M, only sent to trusted platforms.

50 — L, require identity of recipient only.

O, none.

DATA

52 — Surname: H
54 — Forename: L
56 — Postcode: H
County: M
City: M
Road: H
Gender: O
60 — Age: Specific rule, round to nearest 5 unless platform trusted — 61

TEST DATA — 70

Dummy name: Smith — 71
Dummy age: 35 — 72
Dummy address: My town — 73

Fig. 3

METHOD OF CONTROLLING THE PROCESSING OF DATA

CROSS REFERENCE TO RELATED APPLICATIONS

The subject matter of the present application may also be related to the following U.S. Patent Applications: "Enforcing Restrictions on the Use of Stored Data," Ser. No. 10/049,213, filed Feb. 5, 2002; "Computer Platforms and their Methods of Operation," Ser. No. 10/049,211, filed Feb. 5, 2002; "Trusted Terminal," Ser. No. 10/088,258, filed Mar. 13, 2002; and "An Information Security System," Ser. No. 10/296,557, filed Nov. 22, 2002.

TECHNICAL FIELD

The present invention relates to a method of controlling the processing of data, such as contained within the private data. private data. In particular the method relates to controlling access to the information

BACKGROUND

In order to ensure that the processes handling the processing or transfer of data do not become subverted or corrupted it is advantageous to be able to ensure that a computing platform is trustworthy. Such computing programs are known as trusted computing platforms.

A trusted computing platform may be, for example, of the type described in WO00/48063. Thus the computing platform may contain several trusted compartments which may operate at different levels of trust. The trusted compartments isolate the processes running within the compartment from processes in other compartments. They also control access of the processes or applications running therein to platform resources. Trusted compartments have additional properties in that they are able to record and provide proof of the execution of a process and also provide privacy controls for checking that the data is being used only for permitted purposes and/or is not being interrogated by other processes.

The "walls" of compartments may be defined by dedicated hardware or by being defined in software.

Such trusted computing platform (TCP) architectures are based around the provision of a trusted component which is tamper resistant or tamper evident and whose internal processes cannot be subverted. A TCP preferably includes a hardware trusted component which allows an integrity metric (ie. a summary of an integrity measurement) of the platform to be calculated and made available for interrogation. It is this device which underpins the integrity of a TCP. The trusted component can help audit the build of the platform's operating system and other applications such that a user or operator can challenge the platform to verify that it is operating correctly.

Co-pending applications of the applicant, such as European Patent Application No. 02255245.9 entitled "Privacy of Data on a Computer Platform" filed on 26 Jul. 2002, disclose that it is possible to provide an audit process that can verify that a process can be run on a trusted computing platform, that access by the operator or owner of the trusted computing platform to the processes is inhibited, and that access to the audit information is restricted.

In a preferred implementation the audit process exists within a trusted component thereby ensuring that its operation cannot be subverted. The results of the audit are generally stored in protected or encrypted form in memory within a trusted computing platform. The audit data is itself partitioned into sets such that investigation of audit data in one set does not disclose the data in other ones of the audit sets. The trusted component may make an assessment of one or more computing platforms which request the audit data. If the platform is on an unknown or untrusted type, and/or has unapproved means for viewing the audit data, then the data may be withheld.

It is advantageous to propagate private information through a computer platform or system or network, to take advantage of resources and services. Trusted computing platforms, of the type described previously, for example, may provide a safe processing environment for private information provided that the owner of the private data retains control over the private information.

BRIEF DESCRIPTION OF THE INVENTION

According to a first aspect of the present invention there is provided a method of controlling the processing of data, wherein the data comprises a plurality of usage rules for a plurality of data items, and applying individualised usage rules to each of the data items based on a measurement of integrity of a computing entity to which the data items are to be made available It is thus possible to provide a method of controlling access to data in which each data item has individual usage rules which may comprise individual mask data.

The usage rules may define the use for which the data can be used and/or the security to be applied to the data items.

The data items may be fields within a block of data. Thus a data item might be an individual's age, another might be their surname and so on. Preferably the data is private.

Preferably each data item can be made confidential by masking it. This may, for example be achieved by encrypting the data item with its own associated encryption key. Preferably the encryption keys for different data items are different. Thus, in essence, each field is preferably individually maskable by the use of encryption or other forms of masking. A list of keys and associated data items and/or other data can be considered as being mask data. When masking is done by encryption means, the mask data includes both masking (encryption) keys and also unmasking (decryption) keys if the decryption key is different to the encryption key.

Preferably the computing entity or platform that generated the mask data, such as encryption keys, retains the mask data or the ability to regenerate the mask data for as long as it has an interest in the data.

A separate copy of the usage rules, which may include mask data, is advantageously held with each copy or instantiation of the private data. If a data item or field within the data is masked by the use of encryption, the corresponding unmasking entry in the corresponding copy of the mask data is erased. If data is masked using symmetric encryption, the corresponding masking entry in the copy of the mask data is also erased, because in such cases the masking entry inherently provides unmasking information. The computing entity that wishes access to the masked data can be required to contact the entity that generated the mask to obtain the means to unmask the data. Alternatively the computing entity that generated the mask may supply means to the entity that wishes to access the data to enable it to regenerate the mask and to thereby acquire a local copy of the unmasked data.

Individual data items may have individualised usage rules associated with them. Thus a user or owner of the data may be happy to allow information concerning the owner's gender to be made available as that data applies to roughly 50% of any population and hence does not allow the individual to be identified. However some owners may be very conscious that they do not wish to give out full address information or post code (zip code) information as it enables them to be identified, either individually or as a member of a small group of people. An owner of data can therefore individualise the security rules for each data item.

The data may be required by a plurality of computing entities. The instantiation of the data at any entity depends on the capabilities of that entity but preferably includes all the data, and even more preferably masking data, masked data and unmasked data. A computing entity may be a computer platform or it may be a service, process or application running on the computer platform.

Thus different applications which constitute different entities on the same computing platform may be presented with differing views (instantiations) of the data.

A computing entity, either hardware or software, is often called a "node" and this term will appear hereinafter.

Preferably the computing entity is or is executed on a trusted computing platform.

Preferably where data is transferred between computing platforms it is transferred in a secure manner, for example in confidential form with proof of origin, authenticity and integrity, and any such security measures taken for the transport of data are preferably in addition to any security measures acting on the data items by virtue of security controls in their usage rules.

Thus, it may be presumed that the information is made available only to the intended recipient. Even if the data is in encrypted form when being passed by the transport processes between nodes, the data once it arrives at a node can be considered as being in plain-text form, except for those data fields which the supplier of the data has chosen to mask by virtue of the security rules applied to particular data items.

Preferably a computing entity or node can reliably and irrevocably deny future access to selected data items currently under its control.

The data advantageously is signed by the receiving entity after it is transferred between computing entities. The signature may be calculated by reference to the non-masked data items within the data. The key used to sign the data is a secret kept by the computing entity signing the data. The corresponding public key is thereafter included within the data. Signatures and/or the corresponding public key may be used in an audit trail to verify that a node has sent data or to prevent false accusation of sending data.

Preferably the data is associated with constraints which define and/or limit the purpose for which the data can be used, where it may be propagated, a time frame in which the data may be used or propagated or manifested, and the parameters that computing platforms must satisfy.

Advantageously the data comprises both real data, such as real private data, and also test data that has a structure similar or congruous to that of the real data and which is innocuous. Thus release of the test data is unlikely to evoke undesirable consequences but can be used to examine the performance and/or security or integrity of a node to which the real data may be released depending on the results obtained using the test data.

Preferably hostage material may be delivered to the owner of the data or the node issuing the data. The purpose of the hostage material is to provide means of compensation or redress to the owner of the data if it transpires that the data has been misused or that constraints imposed by the owner of the data have not been observed.

A trusted third party may need to be contacted in order to activate the hostage material. Advantageously a node that finds itself in possession of data (i.e. private data, whose history is unknown, dubious, or in some other way undesirable for example because the history or content of the data do not meet requirements, for example, because a new "security policy" has changed predetermined requirements) formats the data, preferably using a public encryption key which is transported as part of the data, and places the data in a repository. The repository may be open to inspection by certification and policing authorities. Advantageously the repository contains encrypted data, with the means associated with the data to enable the owner of the data to identify it.

The means enabling the owner to identify the data may be an identifier automatically or manually associated with the data by the owner of the data.

It is possible that data processing may start at a first node and later on involve another node that already contains an instantiation or manifestation of the same private data. This may be because use of the private data requires access to other (possibly secret) data that does not exist at the first node. Alternatively the other node may contain an unmasked version of the private data and may also advantageously contain other data that can be used to unambiguously identify the entity (which is likely to be the owner of the data) that determined the constraints that are associated with and apply to the data.

The nodes may be normal computing platforms, i.e. PC's and mainframes. Preferably the nodes have the architecture and functionality of trusted computing platforms and most preferably are arranged such that access to data and the results of processing on the data is set solely by constraints associated with the data. Thus the computing platform owner or administrator cannot observe the data or the results of the processing if such observation is not permitted by the constraints associated with the data.

Preferably the data is manipulated by nodes comprising a trusted computing platform running a compartmentalised operating system, with some of the compartments being secure and one of the compartments running an audit portal as described in the Hewlett Packard patent application titled "Audit Privacy" and whose techniques and teachings are incorporated herein by reference.

Thus the audit portal and an associated audit viewer running in another compartment stores audit information using encryption, and stores the decryption keys in a trusted computing module protected storage function. The audit viewer provides the only method of viewing the audit data.

The trusted computing module makes integrity measurements of the operating system and will only release the audit keys to view the audit data if the operating system is in the correct state.

The administrator can run any application he likes or change the operating system (because he is the administrator) but if he alters any setting that affects the mandatory audit and/or viewing properties, thus seeking to give himself rights to view the data, the trusted computing module measures the change and will not release the keys that provide access to data.

Preferably the data is enabled for use by the computing entity via cryptographic keys. Preferably such cryptographic keys or at least one key providing access to those keys or other means of enabling access to the data (such as logical information or addressing information) are stored within the trusted computing module and can be erased via instructions originating from the private data or via signed signals received by the trusted computing module.

Preferably the data can contain audit instructions. The audit instruction may contain or comprise contact information that enables, or indeed requires, messages to be sent to previous nodes that had propagated the data. The data may prescribe the frequency with which previous nodes must be contacted. It may also prescribe the number of contacts, failed contacts or propagations that the data may undergo before any instantiation of it must be erased.

Advantageously prior to copying data to another computing entity a check is made on a propagation control rule or word which controls whether further copies of the data are permitted. The rule may contain a copy count that is modified each time that data is propagated. If further copies are permitted, the computing entity creates a temporary copy of its own instantiation of the data and signs all the unmasked fields of the data if the current signature is unsuitable or no such signature exists, for example if all of the data or additional data was created on this computing entity. The computing entity then interrogates the destination entity. Such interrogations may for example be in accordance with the "TCPA design philosophies and concepts" versions 1 and 1.1 published by the trusted computing platform alliance. The current URL of which is www.trustedpc.org or www.trustedcomputing.org. Reference should also be made to "Trusted computing platforms: TCPA technology in context", Balacheff, Chen, Plaquin, Pearson & Proudler (Ed: Pearson), published by Prentice Hall, ISBN 0-13-009220-7.

Depending on the privacy mechanism and privacy policies supported by the destination entity, the computing entity preparing to send the data masks none or some or all of the data items in its temporary copy in accordance with the individualised security rules relating to those items and/or global rules set by the owner of the data. A recipient therefore receives only the unmasked data that the rules permit him to receive.

The entity preparing to send the data may then, when appropriate, erase the corresponding copy of the unmasking data (e.g. a symmetric key or private asymmetric key) in the temporary copy, and may erase the corresponding copy of the masking data (e.g. a symmetric key) in the temporary copy. The temporary copy of the data is then sent to the receiving computing entity where it becomes that entity's instantiation of the data.

Upon receiving the copy of data, the receiving entity generates any new secrets that will accompany the data in future, such as a new signing key. It then increments the copy control word (this may have been done when preparing the copy for transmittal) and signs the data with a new or existing private signing key and appends the new public signing key to the data.

The receiving entity may further process the received data, and fully or part processed results as a result of executing processing on the data may also accompany the data in future.

Where the data has no return information, thereby preventing its owner from being traced via the return information, the data may need to be published so that its owner can pick it up. The published data may include the results of processes, such as tendering, performed on the data.

Preferably such publication is performed by encrypting the data using a public key contained within the data. This may ensure that the data can now only be viewed by its rightful owner. An identifier defined by the owner is then appended to the data. The identifier may be a random sequence, say 20 bytes or so long, which the owner's data processor will search for. Alternatively, an identifier is appended to the data and then the data is encrypted. Thus an owner of data may choose to perform speculative decryption to search for the identifier.

The data is then published in one or more predefined depositories where the owner can search for it. Data may be published more than once, and may be encrypted using different public depository keys associated with the data.

Advantageously a computing platform may test applications to determine their suitability to process the data. Such tests may be done frequently. Tests may involve the use of test values in the data or associated with the data. The results of such tests may be published, for example, by one of the methods described previously, such as encrypting the data using a public key contained within the data, appending an identifier to the data, and depositing the data within a depository.

According to a second aspect of the present invention, there is provided a method of controlling the processing of data, wherein the data comprises a plurality of rules associated with a plurality of data items, said rules acting to define the use of the data or security to be observed when processing the data, and in which forwarding of the data is performed in accordance with mask means provided in association with the rules.

According to a third aspect of the present invention there is provided a processing system for processing private data, wherein the private data comprises a plurality of data fields and each field is associated with customization data that controls the use and propagation of the data, and wherein the processing system is subservient to the constraints deferred by the customization data.

According to a fourth aspect of the present invention there is provided a computing device arranged to receive data and security rules associated with the data, and in which forwarding of the data is performed in accordance with the masking means supplied with the security rules instead of with masking means belonging to the computing device.

BRIEF DESCRIPTION OF THE FIGURES

Embodiments of the present invention will further be described, by way of example, with reference to the accompanying figures, in which:

FIG. 3 illustrates a simple embodiment of security rules within a data set for use with the present invention;

It is now possible to conduct many business transactions electronically. Such business transactions, or the process of tendering for such transactions, may involve the transfer of sensitive or private data from party to party. Transfer of data between unidentified parties can also occur without the knowledge of the owner of the data. This is best illustrated with a simple example.

DETAIL DESCRIPTION

Supposing that an individual wishes to obtain health insurance. Health insurance companies seek a fairly detailed inspection of an individual's medical history before issuing a quote. Furthermore the quotes issued may vary significantly from insurer to insurer.

It is well known that insurance brokers make their business by comparing the quotes of many insurance companies and then offering their client the best or a list of the best policies.

Figures 1, 2:
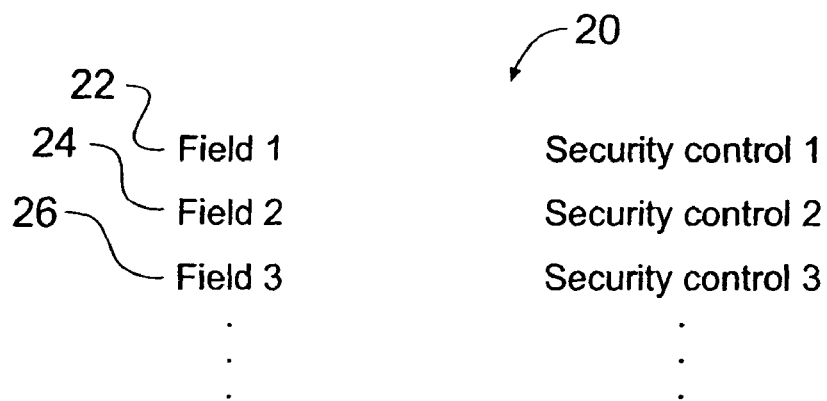
FIG. 1 illustrates the type of questions that may occur when an individual is seeking insurance.
FIG. 2 schematically illustrates a simple data structure in accordance with an embodiment of the present invention.

Such services are now available over the Internet. The individual may log on to a server of a broker and may be required to fill out a form detailing personal information to enable a quote to be derived. FIG. 1 shows a table where the questions asked and our hypothetical individual's responses are summarised.

The questions, for example questions 3 and 4 relating to name and address, seek information that is sufficient to uniquely identify the individual. Other questions probe the medical history of the individual and may relate to data that the individual would not want known to others. Thus, for example, question 25 asks a specific question about treatment of a specific disease X. Disease X may be a disease that carries a social stigma or a real and continuing risk to the health of the individual or others close to that person. In order to get valid insurance an individual has to disclose the existence of disease X. However, they may be reluctant to do this since the form also contains information to uniquely identify them.

Following completion of the form, the broker's computer then contacts other computers owned or run by insurers and sends the results of the questionnaire to them. Thus the individual has lost control over his personal information and has no idea where it has been sent, or what processing is being performed on that information.

As will be explained below, the use of computational systems constituting embodiments of the present invention allow a user to engage in electronic business transactions and tendering processes, but also enable him or her to retain ownership and control of private information.

It is important that an owner of private data can be assured that their data will be stored in a trusted environment and that the data will be handled in accordance with known and reliable rules without the risk of any process subverting or disobeying those rules.

It is beneficial at this point to clarify what is meant by private data, and to compare and contrast it with other data types, such as secret data and public data. Public data is data which is in an open form and is in the public domain. Thus anyone can have access to the data, although of course there may be restrictions about what they can legally do with that data. Secret data is data that is not intended to be disclosed. Private data is sensitive data which is not public data but which may need to be disclosed under certain conditions, such as conditions of confidentiality, to a third party.

A user needs to define their data and to indicate the security or confidentiality control that is to be applied to that data. FIG. 2 schematically illustrates an example of how user data can be organized in accordance with an embodiment of the present invention. The data, which is provided as a block 20, is subdivided into a series of divisions. The divisions may relate to specific information topics or may relate to specific items of information. In this later option each division is effectively a field within the data block 20. For the purposes of illustration only, FIG. 2 shows only the first three fields 22, 24 and 26 of the data block 20, although it will be appreciated that the block can contain much more information. Each field has its own security control. Thus field 1 is associated with a usage control 1 or a security control 1, field 2 is associated with security/usage control 2 and so on. The security/usage controls may be held integrally with the data or in a different file or location provided the association can be maintained.

The security/usage control can be a simple indication of security level which is applied to the field, or it may be more complex and include masking means (such as an encryption key) to be used for masking/encrypting that particular item of data, and/or it may include a definition of rules or tests that are to be applied in order to define the circumstances under which the item of data may be released or propagated.

FIG. 3 schematically illustrates a very simple security scheme where individual security levels are set for individual fields. Thus a user may for example set a High, H, security value in relation to his name such that his name is never passed to a third part without him having been contacted to explicitly authorise this. The individual may however allow data about address information, for example his country of residence, to be given out to third parties who themselves satisfy the criterion of being trusted. Mechanisms for determining whether a party is trusted will be described later on. The individual may be fairly relaxed about giving details of his forename or gender and may chose to apply only a low level of security to this data.

Specific security rules may be set in a definitions section 50 relating to the fields 52, 54, 56 of data. However, some items of data, such as age in this example, item 60, may have a specific rule associated with them, thus rule 61 specifies that the age is rounded to the nearest 5 years unless the computing entity requesting the data is a trusted platform.

The data also includes test data 70 that may be used to interrogate the performance of a node. Thus the test data may include a dummy name 71, dummy age 72 and dummy address 73 as part of the entire set of test data 70.

In general each set of private data will comprise information relating to the person or entity as well as other components relevant to ensuring integrity of the data. Thus, in general, the data may contain:

Personal information, such as:
Name
Address
Age
Income
List of possessions
Current contractual commitments (subscriptions, mortgage, loans etc.)
Desires and likes (holiday, music, type of car)
Applications
Files
Medical history
Location
Applications, which may contain one or more of:
A description of the computing environment necessary to execute the application
A list of the purposes for which the application may be used
A description of the fields to be produced by the processing
Tests that may be performed on the fields to be produced by the processing
Hostage material and a description of the procedure for making the hostage material accessible.
Tests to be applied to a third party computer in order to execute user-defined tests within the 3rd party computer.

The other components that will typically form part of the private data may include:

Test values that are congruent to the basic set of private data, that is they mimic in style and data type the real data within the private data.
Values such as TCPA's PCR values (see the TCPA specification—referred hereinbefore) that indicate the policy system (the platform/software architecture) that is used to enforce the privacy of the private data.
A private data ID which is typically a numeric value or character sting which is large enough to reduce the chance of random collision with another ID in a system of interest to below an acceptable level of probability.

Public keys for encryption of data. Such keys may include a public depository key for use when encrypting data prior to deposition in a repository, and keys used to verify signatures on data.

Constraint data. The constraint data, which is part of the security control data, may include a list of purposes for which the data may be used, a description of the fields to be produced by processing of the data, and tests to be run on the fields resulting from the processing of the data.

A stage identifier, which is a count which is modified each time to indicate how many times the data has been used, that is processed or propagated, together with an upper limit for preventing further use of the data once a preset number of uses has occurred.

Contact information identifying the addresses of nodes that have used the data, i.e. processed or propagated the data.

Symmetric mask data such as a random string or a symmetric key.

Asymmetric mask data, such as an asymmetric public key and private key pair.

Logical masking data, this is an instruction, for example a flag, to instruct the recipient not to read the data.

Identification of the trust domain within which the data may be copied and/or identification of domains from which the data is excluded.

Figure 4:
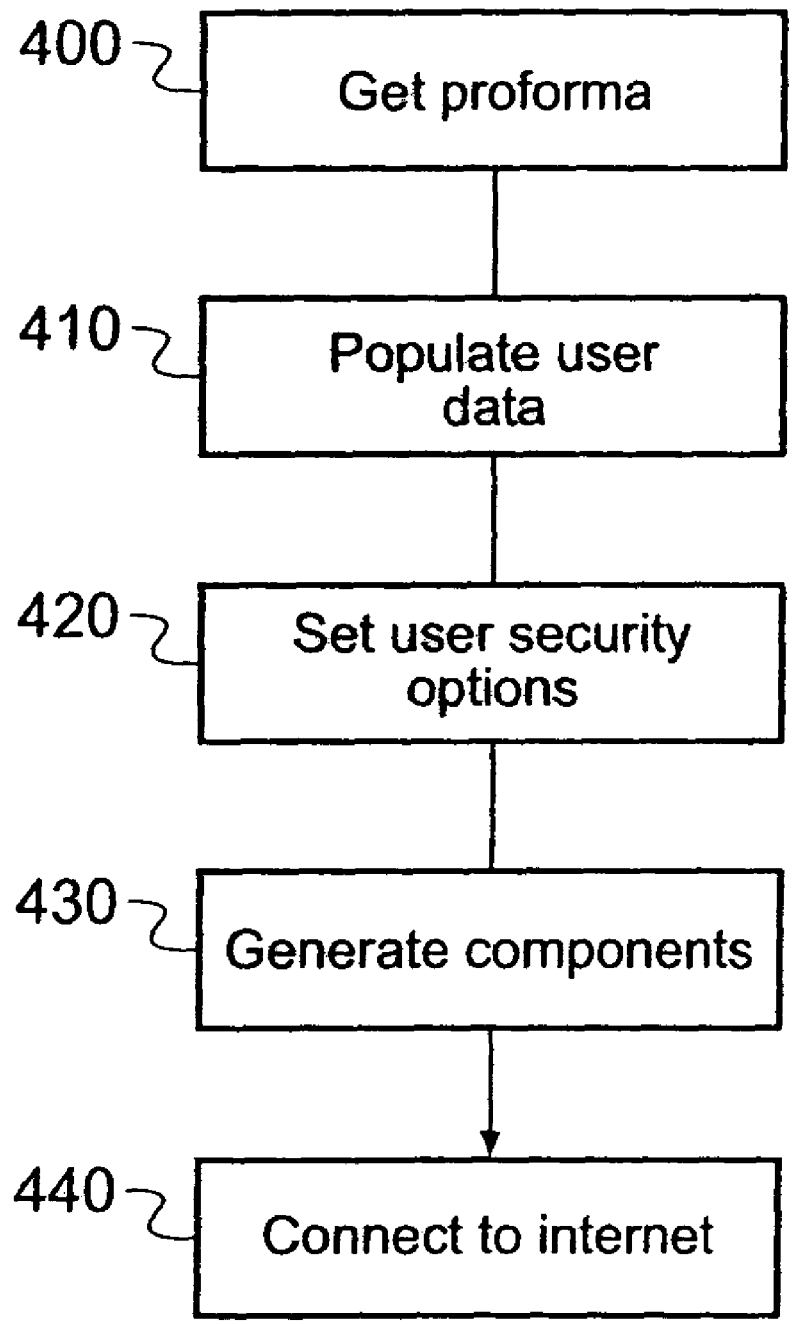
FIG. 4 is a flow chart illustrating the steps performed in the creation of a data set.

Suppose that an individual creates a description about himself on his PDA. That description may have been produced in response to a proforma (step 400, FIG. 4) seeking the information necessary to fill in an application for insurance. Thus the form may include details such as name, age, occupation, address, previous insurance history, information about his car, motoring history and relevant medical conditions. The user populates the form with data at step 410 and then selects his security options at step 420. The PDA has access to a signature key that is used by the individual to indicate his approval of the data, by signing it with the signature key. The key may be held within a user's smart card or similar or may reside within the PDA.

The PDA appends to the data entered by the user other supporting private information at step 430, such as innocuous test values that are congruent (i.e. of compatible type) to the personal information, TCPA-PCR values that indicate the range of platforms that may host the private data, a randomly chosen data ID value, a depository key, a public key used to verify a signature over all the private data, randomly derived mask data sufficient to mask all the fields of the personal description, a statement indicating the intended function of the data, that is that it is for use in the generation of a quote for vehicle insurance, a statement giving constraints of how far the data may be propagated, thus propagation may be limited to within the United Kingdom only; and a contact address of the PDA.

Following generation of such information the individual connects his PDA to the Internet (step 440) and the PDA contacts a search engine, or alternatively uploads the data to a trusted host that contacts a search engine, to locate nodes that are willing (and able) to host private data. We will suppose that two nodes are located, one being an ordinary untrusted computer platform whereas the second node is a trusted computing platform that provides controlled and audited levels of privacy. Purely for illustrative purposes, the ordinary untrusted computer platform scenario uses symmetric mask data. (The trusted computing platform scenario does not do any masking.) The ordinary untrusted computer platform does not permit execution of external applications. In any case, it provides no means for the source of such applications to verify that the platform is a safe place to execute such applications, so it is by no means certain that the source of such applications would want to execute applications on the ordinary untrusted computer platform. In contrast, in this example, the trusted computing platform does permit execution of external applications.

Identifying a Trusted Platform

The ability to trust a platform underpins the implementation of the present invention. Security systems have traditionally relied upon placing security features at the application level. Whilst this is an enhancement it does not guarantee that the operating system or BIOS has not been tampered with.

WO00/48063 discloses a trusted component built into a computer platform. The trusted component comprises both built in hardware and a software entity.

Figure 5:
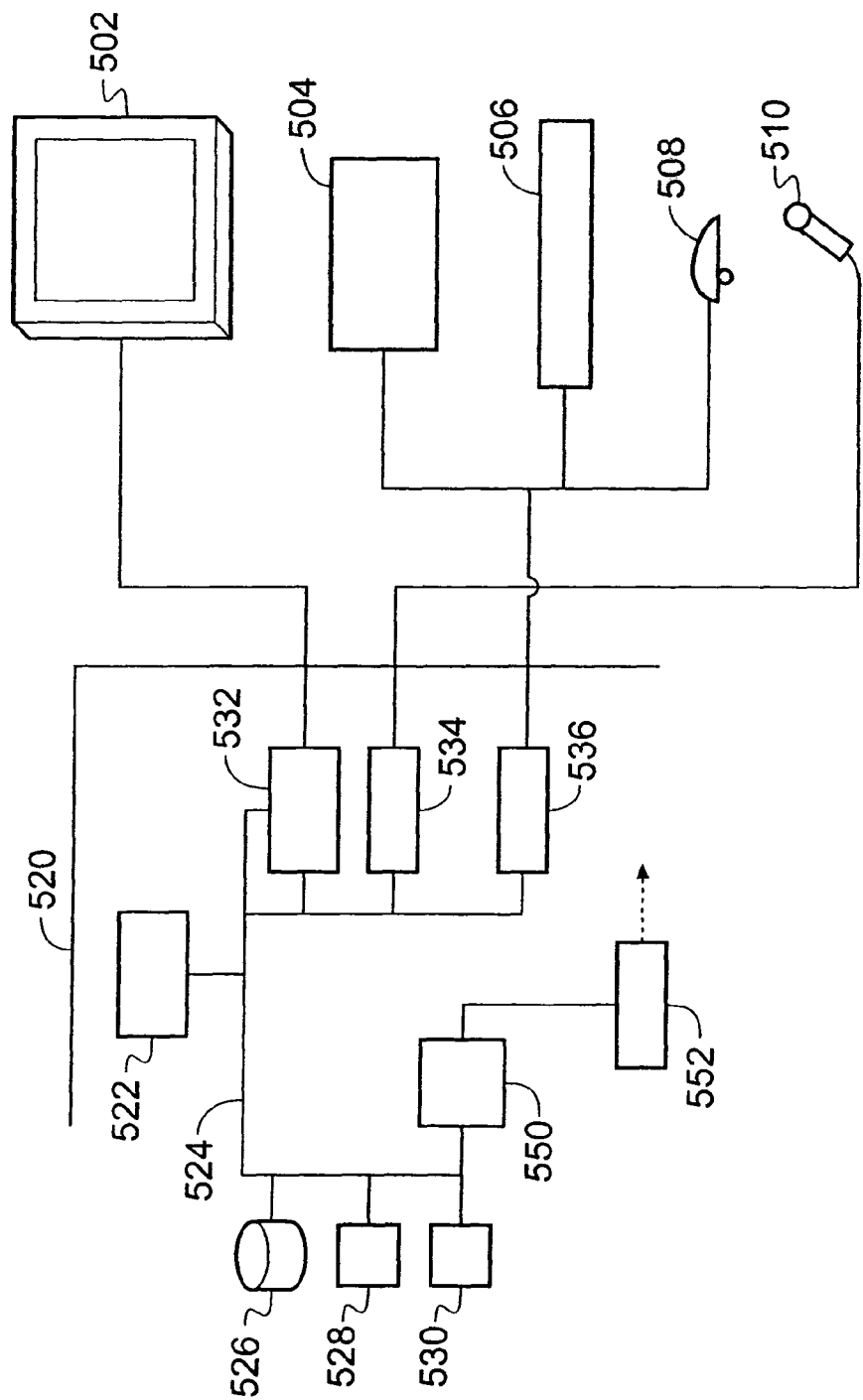
FIG. 5 illustrates the architecture of a trusted platform.

The trusted computing platform, for example as illustrated in FIG. 5, includes an output device such as a VDU 502, or a printer 504; input devices such as a keyboard 506, a pointer which typically is a mouse 508 and a microphone 510. These interface with the computer 520 which has a data processor 522 which interacts over a bus 524 with a mass storage device 526, semiconductor readable and writable memory 528, and a read only BIOS 530. In fact, the BIOS 530 may be implemented in a rewritable non-volatile technology such as EEPROM so that it can be rewritten with care. The computer also includes interface cards, such as video 532 and sound cards for interfacing with the peripheral devices as well as communications paths, for example a universal serial bus 536.

A trusted component 550 is also included within the computer. The trusted component 550 may itself have a direct interface 552 to user input/output devices. Thus, for example the keyboard 504, mouse 508 and monitor 502 may be connected to a suitable interface 52 such that the user can be assured that data output on the monitor 502 or received from the keyboard 504 cannot be interfered with.

The trusted component 550 is a tamper resistant hardware component which is manufactured in accordance with strict rules and whole operation is assured because is internal computational processes cannot be subverted.

The trusted component 550 may however be influenced by entities having appropriate authentication and authorisation mechanisms.

Typically the trusted component 550 will monitor the files and/or data contained in the BIOS, operating system and applications run on the computer. The monitoring is dynamic and allows measurements of the computing environment to be made. These measurements are stored in a reserved memory. The reserved memory may exist within the trusted component 550 and also in the semiconductor memory 528 and mass-storage memory 526. The reserved memory may store the results of the measurements of the files and applications running within the system. Digests of the measurements are known as integrity metrics and are stored in a protected form in the reserved memory of the trusted component 550.

It should be noted that any target platform could have a number of different states of trust. Thus, where a platform hosts a plurality of different processes some may be trustworthy for a given purpose, others not, and some may satisfy some tests of a trustworthy site and have failed others.

During the test to identify the nodes, the target nodes are interrogated, for example using an integrity challenge of the type described in the TCPA specification, and the responses together with supporting information about the host platform's security policies and the user's policies are evaluated to determine whether a target will be asked or allowed to tender for the business.

Figure 6:
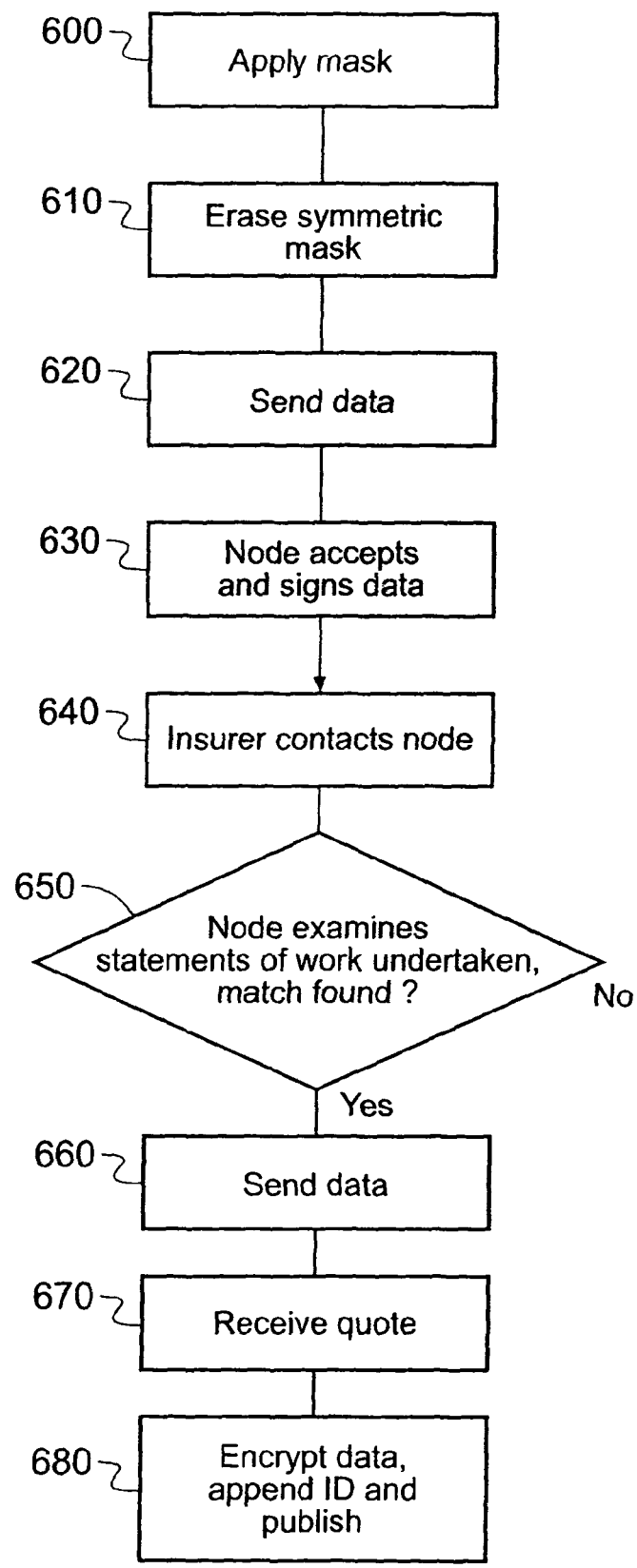
FIG. 6 illustrates operation with regard to an untrusted node.

Having identified the untrusted first node, the PDA creates, or the trusted service at the Internet host creates, a first copy and masks out those items which the user has defined as being sensitive at step 600 of FIG. 6. Thus the name, address and PDA contact address fields (fields that have H or M security in FIG. 3) may be masked out such that it is not possible to identify the owner of the data. Any symmetric mask means are then erased from the data at step 610 to prevent that mask being available to the recipient to unmask masked fields. The PDA or secure Internet service then sends the data to the first node at step 620 which accepts the data and signs it with its own signature key at step 630. The signature key is newly generated for the data and hence is unique (or at least exceptionally rare).

An electronic service from an insurance company trawling for work contacts the node at step 640 and sends one or more statements indicating the types of work for which it will give quotes. The node examines the statements at step 650 and if a matching statement is found, for example "MOTOR VEHICLE INSURANCE" then control is passed to step 660 where the data is sent to the insurer together with an identifier such that the result returned from the insurer can be matched to the data. After receiving the returned quote at step 670, the first node appends the quote to the data and encrypts the data with the public key of a public-private key pair, the public key being in the data provided by the user. The node then appends the ID (unencrypted) to the encrypted data and publishes on its web site at step 680.

The individual seeking the quote then occasionally visits the web site of the first node, making sure to capture (ie. download or view) sufficient objects to prevent a malicious observer deducing an interest in any given public object. When an individual finds a published object that matches his or one of his ID's, the individual then attempts to decrypt the object and unmask any masked fields. If the decryption succeeds and/or the decrypted object contains unmasked data that matches that of the individual and/or contains a signature that matches the individual's signature for all of his private data then the individual can be assured that the object relates to him.

If the individual wishes to accept the insurance quote, the individual contacts the relevant insurance company. In order to prove to the company that he has received a quote and to allow them to process the request fully, he provides the original copy of his private data and the decrypted copy of the published version of his private data. This provides sufficient data for the insurance company to verify that one of its agents proposed the quotation and that the first copy provided to it was derived from the original copy of the private data. The individual and the insurance company can then exchange a contract of insurance.

Alternatively, it may be acceptable that the individual simply sends the requested payment via an anonymity service to the insurance company and receives a receipt thereof to confirm that insurance has been issued. The individual only needs to contact the insurance company when he has to make a claim against his insurance. The individual sends the original copy of his private data and the decrypted copy of the published data in order to allow the insurer to verify that it has underwritten the individual.

Figure 7:
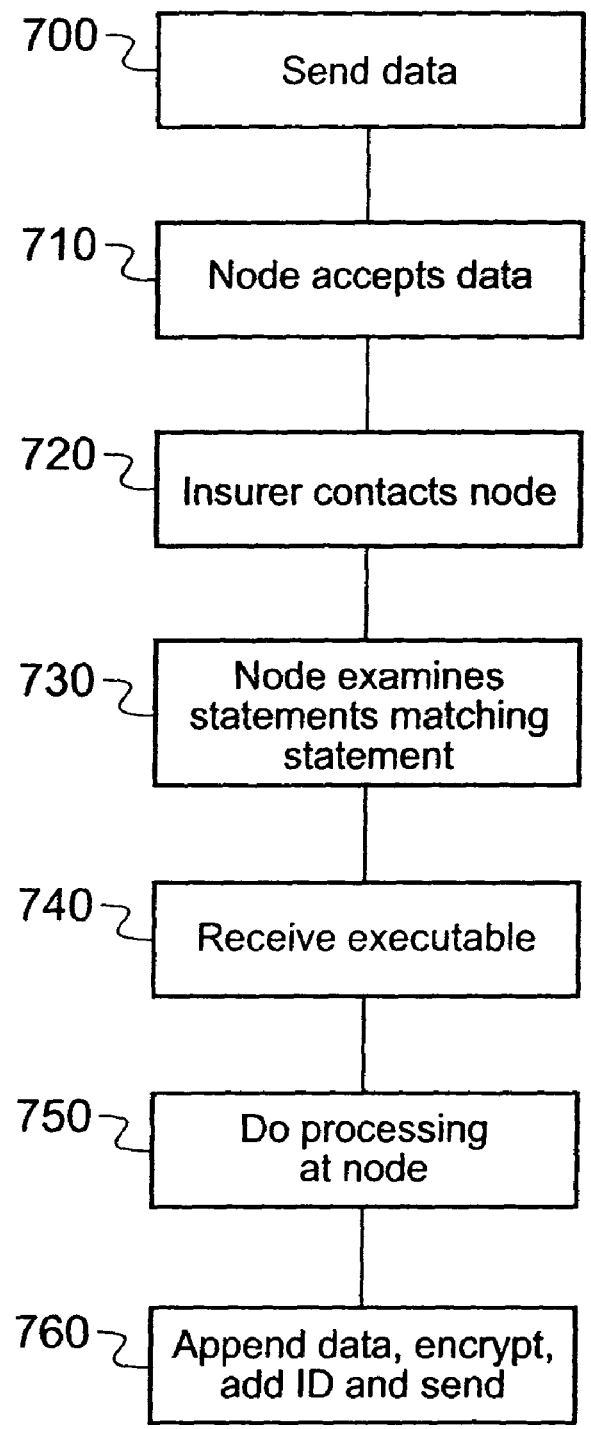
FIG. 7 illustrates operation with regard to a trusted node.

In the case of dealing with a trusted second node, the PDA or secure service makes a copy of the private data and sends the data to the second node at step 700 of FIG. 7. The trusted second node accepts the copy of the private data, generates a signature key and signs the data at step 710.

Now, when an insurer contacts the second node at step 720 the node examines the statements in the descriptor of services sent by the insurance company and if the company can offer a quote for motor insurance, the second node allows the insurance company to execute its quote service on the private data, by sending an executable to the second node (step 740). After the second node has calculated the result (step 750) the second node copies the private data, appends the quote details, encrypts the data with the user's public key, appends the ID and sends the result to the PDA contact address detailed in the private data. These tasks are performed at step 760.

The individual receives the object and attempts to decrypt it. If the decryption is successful then the individual can be fairly certain that the object is intended for him. However, this can be confirmed by checking if the decrypted document contains personal data that matches the individual's private data and/or the signature on the unmasked data matches the individual's signature.

If the individual wishes to accept the quote he can contact the insurer as described above.

In variations on the service the trusted node may not initially release the private data to the service providers. Instead the trusted second node may be instructed by the security conditions imposed by the owner of the data only to release the test data in the first instance. The service provider, ie. the insurance underwriter, acts on the test data as if it were the real data because they cannot tell that only test data has submitted. The results of the tests are examined by the node using the rules in the usage information. If appropriate, the node permits the executable to be applied to the real data. Alternatively the results of the test data are returned to the user using the same data transport and handling techniques are described above. The individual can examine the results returned from the operation of the test data, and if they approve the submission of the real data to the service provider, the individual republishes his private data with permission to execute the service on the private data.

A platform may promiscuously test applications to determine their suitability to process private data and may use result rules included in the usage rules, or submit results to the user for explicit approval (as previously described). If an application is suitable, the results may be appended to the private data. Resultant private data may be communicated to the entity responsible for the application. Resultant private data may be communicated to the platform that provided the private data. A copy or copies of resultant private data may be published (as described above).

A platform may promiscuously test applications using private data to determine their suitability to process other data, and may use result rules included in the usage rules, or submit results to the user for explicit approval (as previously described). If the application is suitable, the results may be appended to the private data. Resultant private data may be communicated to the entity responsible for the application. Resultant private data may be communicated to the platform that provided the private data. A copy or copies of resultant private data may be published (as described above).

Using private data to determine whether results are acceptable may require copying of private data to other nodes. This is the case when a particular usage of private data does not contain result criteria, or the result criteria are masked.

Speculative applications can be of use when the private data relates to, for example, an individual's finances and the trusted node holds an individual's bank account information but does not belong to the bank and instead executes the bank's applications that manage the individual's account. A speculative application that might be valuable to the user might be a third party service that verifies that the bank is managing the account correctly, for example paying the correct amount of interest when the account is in credit or deducting the correct changes when the account is in debt.

In a further example of the present invention, the second trusted node of the above example may detect that an instruction is being issued to it by its owner that will initiate a change in the configuration of the node. An extreme example may be that the node is being instructed to give data out to any third party that requests it.

Given that the node is a trusted node, it must first check through all the private data that it is hosting and check whether the data could still be held on that node, in accordance with the security provisions specified by the owner of the data once the node has changed to its new configuration. For data that cannot continue to be held, the node deletes the controlling key or keys in its trusted module 550 that provides access to the data from its trusted module 550. Thus, even if the data on the node is restored from back up systems, the private data does not become accessible because the decryption means was held within the TPM and has been destroyed.

Only when all private data that cannot continue to exist in the new configuration has been rendered unusable can the node then implement its change of configuration.

In another example, it is highly likely that an individual will hold personal files on his personal computer. The personal files may contain private information. There may also be innocuous test files that have dummy information which is broadly consistent to or equivalent with the real private information. Thus any test field is of the same type as an equivalent field in the real data, such that both can be manipulated in the same way. The data may also include means for interrogating the integrity of a target platform, such as the trusted computing platform alliance's (platform configuration register, PCR) values that indicate or define the properties of the platforms that may host the private data. The data may also include a randomly generated ID, for example of 20 bytes or so, which is therefore likely to be unique during the time frame for which the data is required. The computer will also store a depositary key, a public key used to verify the signature over all signed private data and sufficient keys (preferably randomly chosen) to encrypt all the personal files. The computer also may contain one or more statements concerning the intended or mandatory use of the private data. Thus one statement may define that the data is for use by textural editors or spreadsheet calculators. A further statement may indicate that the data may only be duplicated within the UK. The restriction on duplication may be modified, for example by specifying that the duplication is limited to web sites manifested in airport lounges during a predetermined time period.

The individual may also have a PDA that contains supporting private information, primarily the masking information, but not the personal files.

In order to prepare for access to his data, the user instructs the computer to create a temporary copy of the private data it holds. The computer masks all the personal real and test data files by asymmetrically (say) encrypting with the relevant mask information (that is security control information) supplied from the PDA. The computer sends the temporary copy, optionally via an anonymity service, to a service that acts as a gateway to the airport computers in airport lounges.

The gateway distributes the private data to the airport computers in accordance with the distribution parameters contained within the statements of use.

When visiting an airport lounge, the individual connects his PDA to the complementary computer system provided in the airport lounge. The PDA then searches for the private data belonging to the individual.

Having found the individual's data, the PDA issues a challenge to the airport computer to determine if it has a trusted computer architecture. Having verified that this is so the PDA informs the user appropriately.

When an individual wishes to use one of his files, the PDA contacts the airport computer and asks it to demonstrate that it hosts applications capable of generating the desired results from the private data. In order to confirm this, the PDA supplies the airport computer with unmasking data that will unmask the test data; the airport computer may run the application on the test data in the private data, producing an audit trail or log of transactions as it executes the process.

Optionally the airport computer also provides an encrypted version of an indemnity or some other "hostage data" in order to compensate the individual for misuse or violation of his data. The hostage data can be decrypted preferably in cooperation with a third party, who releases or enables release of the hostage data when conditions justify such release, such as when private data has been misused.

If tests using test data were satisfactory, the PDA can then supply the airport computer with the unmasking data that allows decryption of the real personal data. The airport computer then decrypts the real personal data and permits the individual to manipulate the decrypted file using the some program that operated on the test data. An audit trail is generated as before.

At the end of the user's session (which might be complementary or involve a fee) the airport computer uses the masking data to render the personal data confidential. Then the airport computer copies the private data, appends the masked (encrypted) altered personal file, encrypts the resultant object with the public depository key within the private data, appends the ID from the private data and publishes the data on its web site. This can also be done on an airport website or a third party site for recovering such data.

When the owner of the data wishes to retrieve it, he visits the web site, possibly making sure that he captures sufficient published objects to prevent an observer from deducing his identity or interests. When the individual finds an object that matches his ID the individual attempts to decrypt the object. If the decryption succeeds and contains unmasked data that matches his own, then the individual recognises the published object as his own. He can then proceed to recover the masked altered data file and to use the original mask or security control to replace the original file with the altered file.

The present invention can further be utilised in order to facilitate the delivery of physical goods. Carriers waste a lot of time when they attempt to deliver goods to a household but find that there is no one there to accept delivery. The carrier cannot easily avoid this, as they cannot discover in advance whether and when someone will be present in the household because householders are reluctant to disclose such information. The main reasons for their reluctance is that householders cannot be sure that the enquiry is legitimate, and even if it is, they cannot be sure that the information will not leak to an undesirable person. In short, they fear that they will be burgled, or suffer a loss of privacy.

Currently, delivery companies try to overcome this problem by leaving the package with a neighbour or leaving a card to indicate that a delivery was attempted and that a given person should be contacted to arrange a repeat delivery. This is an inconvenient and uneconomic process for the delivery company, and inconvenient and irritating for the customers.

In order to overcome this, a household may have a system arranged to automatically detect the presence of people within the house or to maintain a diary that indicates the current and expected presence of persons at that address. The diary can also indicate whether a delivery would be accepted. Such information may be treated as much as private data as the name and address of the household. Private data, including the location information, may be held on the household's computer operating in accordance with the present invention, and propagated to a delivery company's computer operating in accordance with the present invention. Naturally, the household should verify that the carrier is known to the household, and is known to be trustworthy, before propagating the private information to the delivery company's computer.

The carrier maintains a database of goods to be delivered. The database is held within a trusted computing platform having audit privacy. In use, the carrier enters the address of the intended delivery into the database. The carrier supplies an executable program that operates on the household data to reveal when the householder is in, but not when the householder is out. The platform verifies that this type of program is permitted to use the private data supplied by the household. The carrier can observe neither the private data nor the results of the enquiry, and hence neither the computer administrator nor a computer user can deduce the times that a house is unoccupied. The carrier's database then attempts to match the expected presence of someone in the household with a delivery schedule, and to schedule deliveries as appropriate. The carrier's database may notify the household that a delivery is scheduled.

The carrier's personnel cannot query or inspect the database to find the comings and goings of the occupants of the household because the database is on a trusted computing platform that uses TCPA technology (or equivalent) and trusted compartment technology (or equivalent) to isolate data (including applications and results) from the administrator and user of the platform. Thus the carrier's personnel are notified only of a delivery via the delivery schedule.

Preferably the carrier's database randomly selects delivery times from a selection of possible delivery times in order to decrease the probability that times that are not scheduled delivery times can be assumed to indicate the absence of a person at the delivery address.

Advantageously the sender of the goods enters the address of the intended delivery into the carrier's database and receives an identification value or token that does not include the delivery address. The sender can then address the goods with the identification token rather than the conveniently (physical) delivery address. Preferably the delivery schedule is given to the driver in electronic form and a delivery address and identification are not revealed to the deliver until the schedule indicates that those goods are the next to be delivered. It is thus possible to use the secure handling of information in accordance with the present invention to facilitate the operation of services that would otherwise involve a security risk.

The invention claimed is:

1. A method of controlling processing of data in a computer apparatus, wherein the data comprises a plurality of usage rules for a plurality of data items stored by said computer apparatus, and comprising:
   applying, by a computer, different individualised usage rules to each of the data items based on a measurement of integrity of a computing entity to which the data items are to be made available, wherein the measurement of integrity is a measure of whether the computing entity includes a trusted platform providing controlled and audited levels of privacy for the data items and said data items are logically grouped together as a set of data items, and
   instantiating the set of data items at the computing entity depending upon the integrity of the computing entity and the usage rule applicable to each data item in said set.

2. A method as claimed in claim 1, in which at least some of the usage rules comprise masking instructions for masking the associated data items.

3. A method as claimed in claim 2, in which a data item is masked from a set of data by encrypting it.

4. A method as claimed in claim 3, in which a data item is encrypted with an associated encryption key, said encryption key being different for different ones of the data items.

5. A method as claimed in claim 1, in which the usage rules define security rules for the associated data item.

6. A method as claimed in claim 1, in which the data may be transferred between a plurality of computing entities and the instantiation of the data at each computing entity depends on the capabilities of that entity.

7. A method as claimed in claim 6, in which a computing entity is a computing platform.

8. A method as claimed in claim 6, in which the computing entity is a software process.

9. A method as claimed in claim 1, in which a computing entity can reliably and irrevocably deny future access to selected data items.

10. A method as claimed in claim 9, in which means for accessing the data is stored within a protected memory.

11. A method as claimed in claim 10, in which the protected memory is within a trusted computing module.

12. A method as claimed in claim 1, in which computing entities negotiate with one another concerning the use of the data before the data is made available.

13. A method as claimed claim 1, in which the data has constraints defining conditions for use of the data.

14. A method as claimed in claim 13, in which the constraints define at least one item selected from:
   a. the purpose for which the data can be used
   b. the geographical area in which the data may be manifested
   c. the temporal domain in which the data may be manifested
   d. the computing platforms that may manipulate the data.

15. A method as claimed in claim 1 in which the data further includes test data.

16. A method as claimed in claim 15, in which the structure of test data is comparable to the structure of real data contained by the data items.

17. A method as claimed in claim 16, in which the results of operations performed on the test data are examined in order to make a decision on whether to release the real data to a node that operated on the test data.

18. A method as claimed in claim 1, in which a node requesting access to the data supplies hostage material to the node issuing the data prior to the issuance of the data.

19. A method as claimed in claim 18, in which a third party hostage release authority is contacted to activate the hostage material.

20. A method as claimed in claim 1 in which a node finding itself in possession of data whose history or content do not meet predetermined requirements, formats the data and places it in a repository.

21. A method as claimed in claim 20, in which the data placed in the repository is in an encrypted form.

22. A method as claimed in claim 21, in which the data is encrypted using a public key included in the data.

23. A method as claimed in claim 21, in which the data in the repository is associated with an identification means to enable the owner of the data to identify it.

24. A method as claimed in claim 1, in which a node wishing to present the data for retrieval places the data in a repository.

25. A method as claimed in claim 24, in which the data is placed in the repository in encrypted form.

26. A method as claimed in claim 25, in which the data is encrypted using a public key included in the data.

27. A method as claimed in claim 26, in which the data in the repository is associated with identification means to enable the owner of the data to identify it.

28. A method as claimed in claim 1, in which constraints associated with the data determine whether the data will process on anything other than a trusted computing platform.

29. A method as claimed in claim 28, in which constraints associated with the data determine whether the data and/or results from processing the data are inhibited from viewing by a computing platform owner or administrator.

30. A method as claimed in claim 1 in which the security contracts are stored separately from the data.

31. A method as claimed in claim 1 in which mask or decryption keys are stored separately from the data.

32. A method as claimed in claim 1 in which a computing entity that receives data signs the data with a signature key belonging to that entity.

33. A method of controlling processing of data, wherein the data comprises a plurality of rules associated with a plurality of data items, the method comprising:
    applying, by a computer, different rules to the data items, each data item in the set having a rule of the rules associated therewith, said rules acting to individually define at least one of usage and security to be observed when processing each of the data items in the set of data items; and
    forwarding the data items in accordance with mask means provided in association with the rules.

34. A method as claimed in claim 33, in which the mask comprises at least one of a symmetric encryption string, symmetric encryption key, and an asymmetric encryption key.

35. A method as claimed in claim 33, in which the rules associated with the data items are adhered to in preference to data handling rules associated with a computing entity processing the data.

36. A method as claimed in claim 33, in which at least some of the rules comprise masking instructions for masking the associated data items.

37. A method as claimed in claim 36, in which a data item is masked from a set of data by encrypting it.

38. A method as claimed in claim 37, in which a data item is encrypted with an associated encryption key, said encryption key being different for different ones of the data items.

39. A method as claimed in claim 33 in which the data may be transferred between computing entities and the instantiation of the data at each computing entity depends on the capabilities of the entity.

40. A method as claimed in claim 33, in which the rules define at least one item selected from:
    a. the purpose for which the data can be used
    b. the geographical area in which the data may be manifested
    c. the temporal domain in which the data may be manifested
    d. the computing platforms that may manipulate the data.

41. A method as claimed in claim 33 in which the data further includes test data, the test data is comparable to the structure of real data contained by the data items, and in which the results of operations performed on the test data are examined in order to make a decision on whether to release the real data to node that operated on the test data.

42. A method as claimed in claim 33, in which a computing entity finding itself in possession of data whose history or content do not meet predetermined requirements, or wishing to make data available because it has performed some processing in at least partially masked form, formats the data places it in a repository.

43. A computer program stored on a non-transitory computer readable media for instructing a programmable computer to implement a method of controlling the processing of data, wherein the data comprises a plurality of usage rules for a plurality of data items, the method implemented by the computer executing the computer program comprising:
    applying different individualised usage rules to each of the data items based on a measurement of integrity of a computing entity to which the data items are to be made available, wherein the measurement of integrity is a measure of whether the computing entity includes a trusted platform providing controlled and audited levels of privacy for the data items; and
    permitting instantiation of the data items at the computing entity only if the integrity of the computing entity complies with the individualised usage rules associated with said data items.

44. A computer apparatus for controlling processing of data, wherein the data comprises a plurality of usage rules for a plurality of data items stored by said computer apparatus, said computer apparatus controlling instantiation of the data at a computing entity, said computer apparatus including:
    programming, executed by the computer apparatus, for applying different individualised usage rules to each of the data items based on a measurement of integrity of the computing entity to which the data items are to be made available, wherein the measurement of integrity is a measure of whether the computing entity includes a trusted platform providing controlled and audited levels of privacy for the data items and said data items being logically grouped together as a set of data items, and
    programming, executed by the computer apparatus, for individually instantiating data items in the set of data items at the computing entity as a function of the integrity of the computing entity and the usage rule applicable to each data item in said set.

* * * * *

UNITED STATES PATENT AND TRADEMARK OFFICE
CERTIFICATE OF CORRECTION

| | | |
|---|---|---|
| PATENT NO. | : 7,917,752 B2 | Page 1 of 1 |
| APPLICATION NO. | : 10/643306 | |
| DATED | : March 29, 2011 | |
| INVENTOR(S) | : Graeme John Proudler | |

It is certified that error appears in the above-identified patent and that said Letters Patent is hereby corrected as shown below:

In column 1, lines 19-21, delete "such as contained within the private data. private data. In particular the method relates to controlling access to the information" and insert -- such as private data. In particular the method relates to controlling access to the information contained within the private data. --, therefor.

Signed and Sealed this
Twelfth Day of July, 2011

David J. Kappos
*Director of the United States Patent and Trademark Office*